United States Patent [19]

Beckmann et al.

[11] 4,119,839
[45] Oct. 10, 1978

[54] KEYBOARD MASK FOR GENERAL-PURPOSE CALCULATOR

[75] Inventors: Uwe L. Beckmann, Morris Plains; Edmund Osterland, Boonton, both of N.J.

[73] Assignee: W & G Instruments, Inc., Livingston, N.J.

[21] Appl. No.: 746,112

[22] Filed: Nov. 30, 1976

[51] Int. Cl.² ............................ G06C 7/02; B41J 5/08
[52] U.S. Cl. ........................... 235/145 R; 340/365 R; 235/146; 400/473
[58] Field of Search .......................... 235/145 R, 146; 340/365 R; 197/98

[56] References Cited

U.S. PATENT DOCUMENTS

| 2,625,330 | 1/1953 | Buckey et al. | 197/98 |
| 3,158,317 | 11/1964 | Alexander | 235/145 R |
| 4,030,094 | 6/1977 | Anderson | 235/145 R |

Primary Examiner—Stephen J. Tomsky
Attorney, Agent, or Firm—Karl F. Ross

[57] ABSTRACT

In order to adapt a general-purpose calculator to specific tasks, the keyboard of that calculator is covered by a mask including a resilient membrane overlain by a rigid panel having cutouts registering with keys whose function is to be preserved. The cutouts receive extension keys glued or otherwise fastened to the membrane, depression of any extension key operating the underlying original key. The functions of the operative keys can be modified, in accordance with the contemplated use, by insertion of a stored-program cassette associated with the particular mask employed.

9 Claims, 4 Drawing Figures

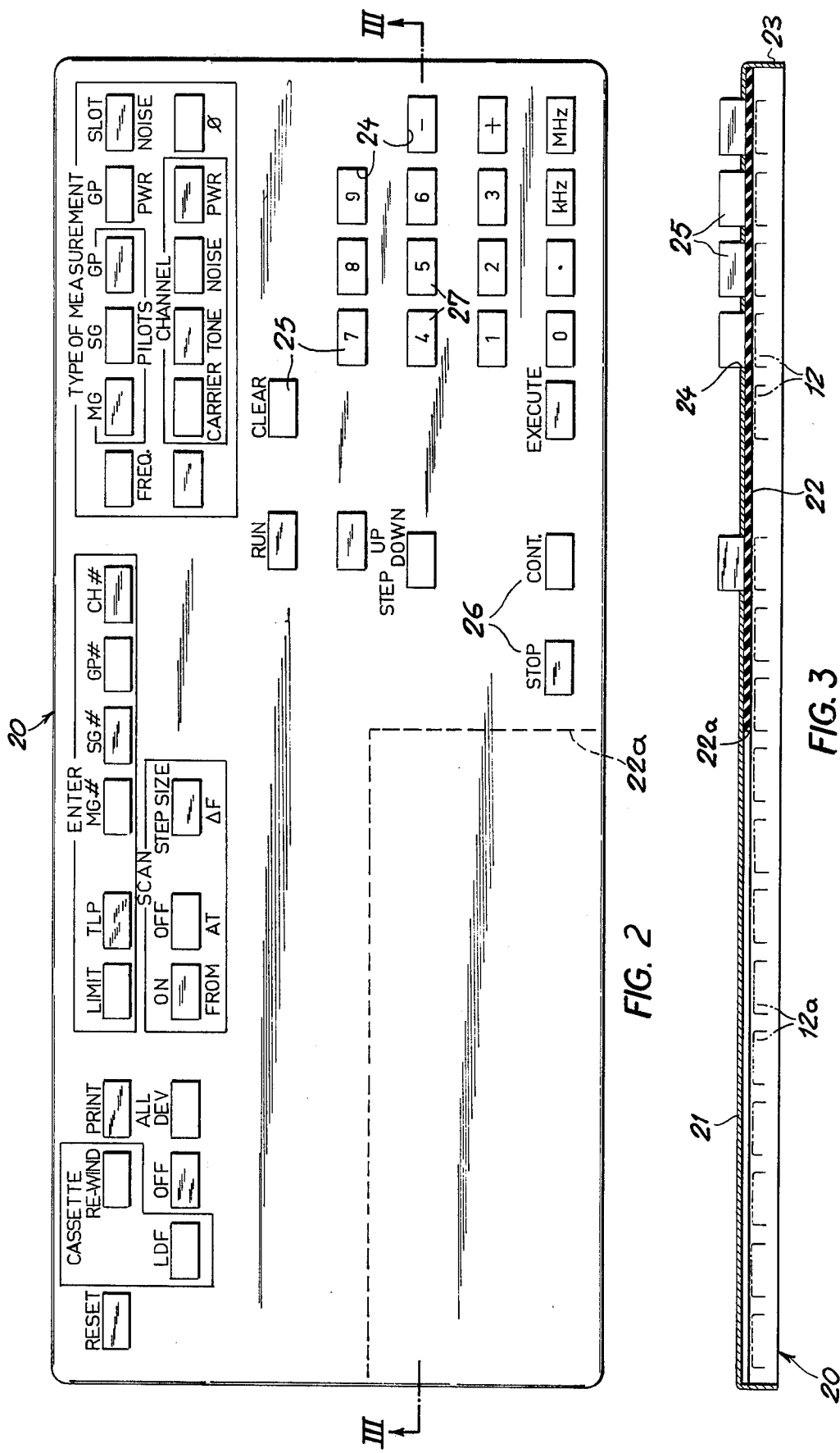

KEYBOARD MASK FOR GENERAL-PURPOSE CALCULATOR

FIELD OF THE INVENTION

Our present invention relates to a keyboard mask for a calculator of the general-purpose type, designed to restrict its mode of operation to a specific task.

BACKGROUND OF THE INVENTION

It is frequently desired to limit the accessibility of a calculator keyboard to a selected group of keys, e.g. for avoiding errors in carrying out a special program or for preventing unauthorized personnel from altering or erasing instructions and data already fed into its memory in a preprogramming operation.

Furthermore, in a calculator whose keys are not fixedly wired to its logical circuitry but are selectively connectable thereto by the insertion of a stored-program cassette, a need exists for variably labeling the operative keys in conformity with the chosen program.

OBJECT OF THE INVENTION

The object of our present invention, accordingly, is to provide a keyboard mask whose emplacement on a general-purpose calculator will make certain keys inaccessible and which may also be used as a carrier for markings identifying the function of the accessible keys.

SUMMARY OF THE INVENTION

A keyboard mask according to our invention, designed to realize the aforestated object, comprises a resilient membrane emplaceable over at least a major portion of the associated keyboard, this membrane being overlain by a rigid panel having cutouts positioned to register with the operative keys of the calculator. In order to give access to these operative keys, we provide a number of extension keys which pass through the cutouts of the panels and are so positioned on the underlying membrane as to register with these operative keys.

According to another aspect of our invention, a masking device preferably of the aforedescribed character carries markings functionally identifying the accessible keys of the programmable calculator in accordance with a program stored in an associated cassette.

In order to minimize the chances of accidental depression — e.g. by a denting of the panel — of a key in a preprogramming section of the calculator keyboard, we prefer to cut away a portion of the membrane over an area registering with that preprogramming section.

BRIEF DESCRIPTION OF THE DRAWING

The above and other features of our invention will now be described in detail with reference to the accompanying drawing in which:

FIG. 2 is a face view of the keyboard mask shown in FIG. 1;

FIG. 3 is a cross-sectional view of the mask taken on the line III—III of FIG. 2.

SPECIFIC DESCRIPTION

Figure 1:
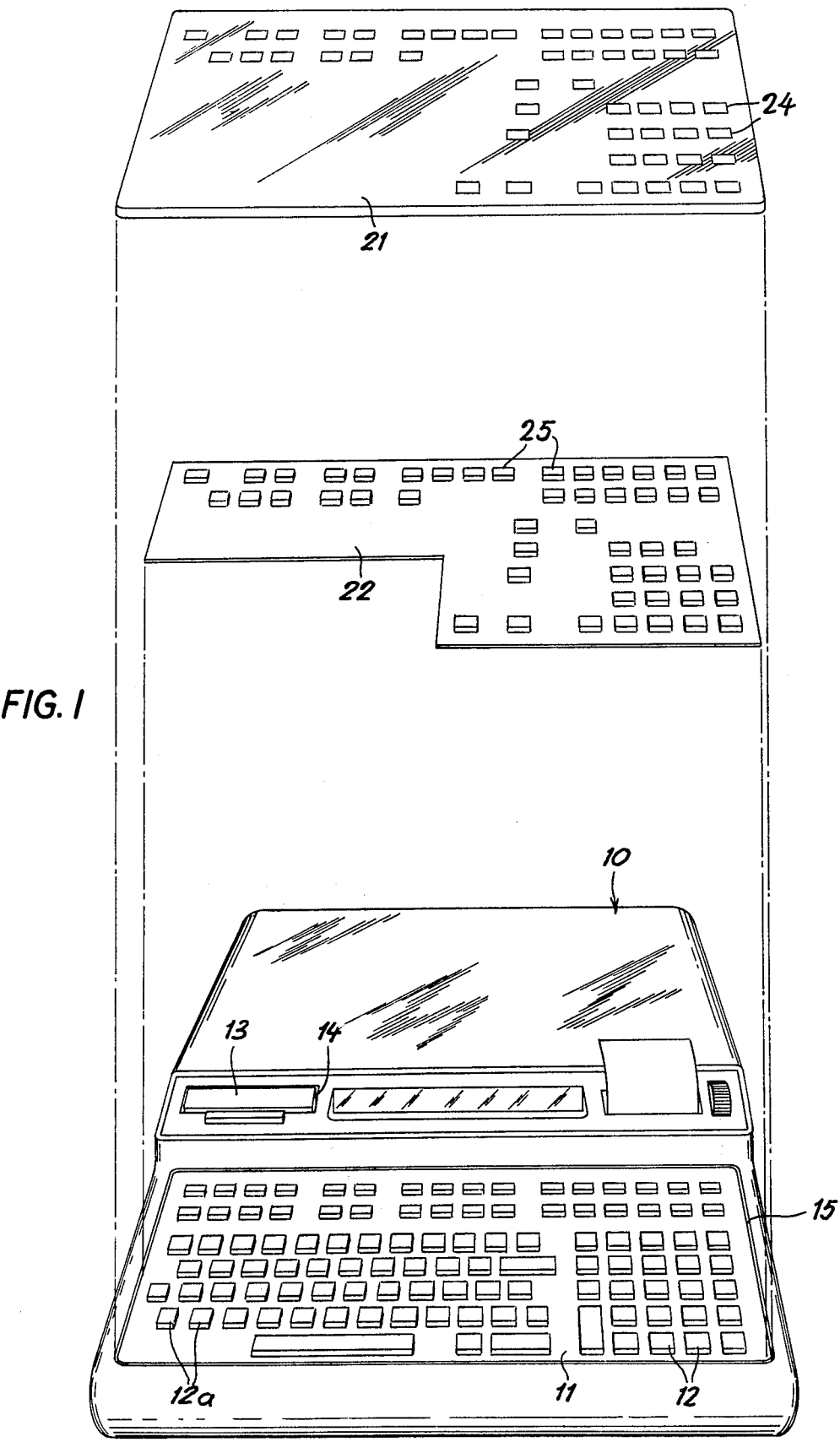
FIG. 1 is an exploded perspective view of a general-purpose calculator provided with a keyboard mask according to our invention.
Figure 4:
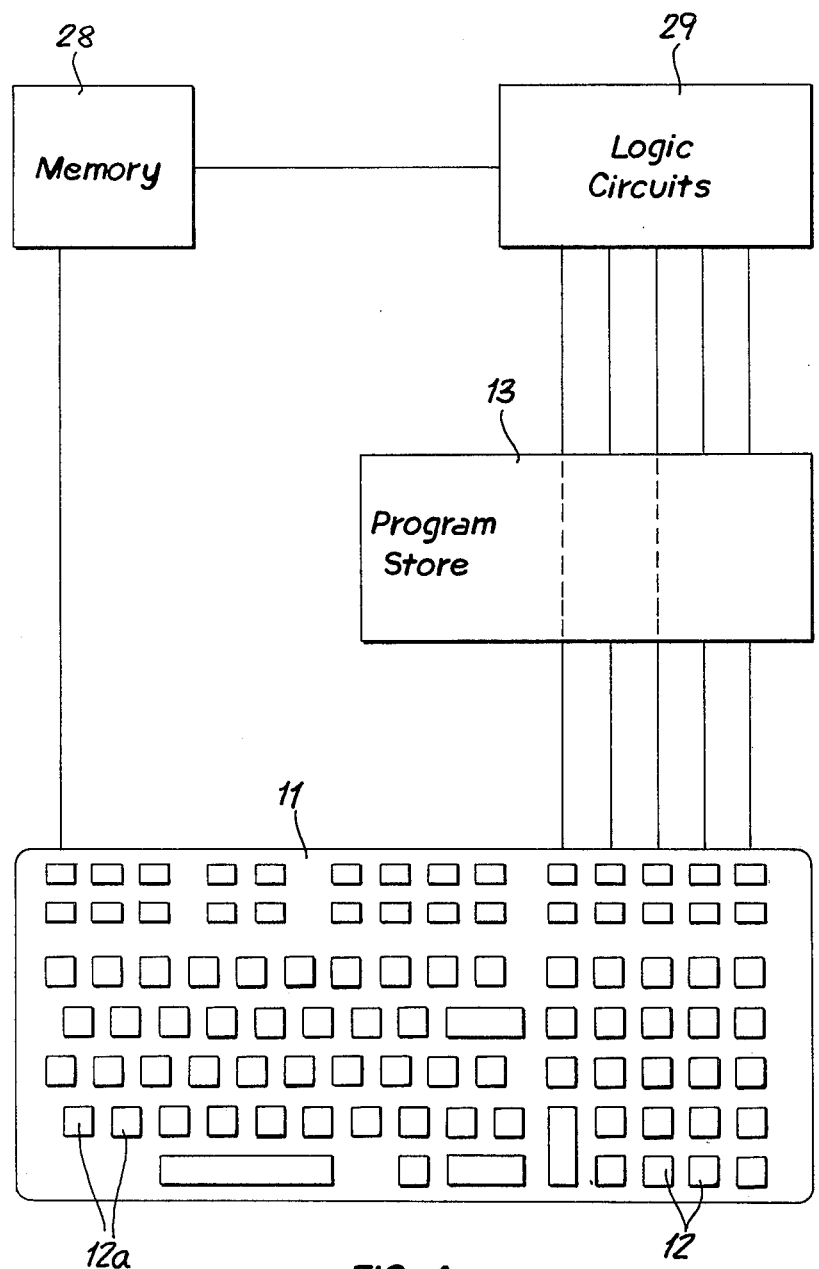
FIG. 4 diagrammatically illustrates the internal connections of the calculator.

In FIG. 1 we have shown a conventional calculator 10 of the general-purpose type equipped with a keyboard 11 carrying a multiplicity of keys 12. Certain of these keys, designated 12a, form part of a preprogramming section (resembling the alphabetic part of a typewriter keyboard) through which instructions and data can be entered in a memory 28 (FIG. 4) of the calculator for use with a variety of programs. These programs are stored in a cassette 13 inserted into a slot 14 of the calculator housing for the purpose of selectively establishing internal connections between logic circuits 29 of the calculator and the operative keys 12, i.e. those taking part in the chosen program, as schematically indicated in FIG. 4.

In accordance with our present invention, a masking device 20 (see also FIGS. 2 and 3) fitting over the keyboard 11 comprises a rigid panel 21 and a flexible membrane 22 framed by a depending rim 23 of the panel. The panel is metallic or molded from synthetic resin whereas the membrane 22 preferably consists of rubber or other elastomeric material. Panel 21 has a number of cutouts 24 penetrated by extension keys 25 which register with respective operative keys 12 on the underlying keyboard. The membrane has an essentially rectangular outline, except for a portion overlying the alphabetic preprogramming keys 12a which is cut away along a line 22a.

Extension keys 25 may be secured to membrane 22 by adhesive bonding or in any other convenient way. When depressed, they bear through the membrane upon the respective calculator keys 12 registering therewith which can therefore be actuated by the operator in conformity with adjacent labels 26 on the panel or with markings 27 appearing directly on the extension keys. Labels 26 include such abbreviation as TLP for Transmission-Level Points, MG for Master Group, SG for Supergroup, GP for Group and CH for Channel.

Panel rim 23 closely fits into a peripheral gap 15 surrounding the keyboard 11 within the housing of the calculator 10. Other means for removably securing the masking device 20 to the keyboard, e.g. magnetically or with the aid of clamps, could be used if desired.

In a set of several masking devices and associated cassettes, the panels and their cassettes may be correlated by suitable identification codes not shown.

We claim:

1. A masking device for limiting the operation of a keyboard-equipped general-purpose calculator to a specific task, comprising:
   a flexible solid membrane emplaceable above at least a major portion of the keyboard of said calculator;
   a plurality of extension keys on said membrane positioned to register with selected calculator keys of said portion upon emplacement of said membrane on said keyboard; and
   a rigid panel above said membrane positioned to overlie the entire keyboard, said panel having cutouts penetrated by said extension keys, thereby enabling manual operation of any of said selected calculator keys by depression of the corresponding extension key.

2. A device as defined in claim 1 wherein said extension keys are adhesively secured to said membrane.

3. A device as defined in claim 1 wherein said panel has a depending rim framing said membrane and fitting around said keyboard.

4. In a general-purpose calculator having a housing equipped with a keyboard and provided with a slot for stored-program cassettes establishing operating connections between the keys of said keyboard and logical circuitry within said housing, the combination therewith of a masking device emplaceable on said keyboard for giving access to selected calculator keys only, and a stored-program cassette establishing operating connections only for the calculator keys accessible through said mask; said masking device including a flexible solid membrane positioned above at least a major portion of said keyboard containing the selected calculator keys, a plurality of extension keys on said membrane registering with said selected calculator keys, and a rigid panel above said membrane overlying the entire keyboard, said panel having cutouts penetrated by said extension keys, thereby enabling manual operation of any of said selected calculator keys by depression of the corresponding extension key.

5. The combination defined in claim 4 wherein said extension keys are adhesively secured to said membrane.

6. The combination defined in claim 4 wherein said panel has a depending rim framing said membrane and fitting around said keyboard.

7. The combination defined in claim 4 wherein said keyboard has an alphabetic preprogramming section, said membrane being cut away over an area registering with said preprogramming section.

8. The combination defined in claim 4 wherein said masking device is provided with markings functionally identifying the calculator keys overlain by said extension keys.

9. The combination defined in claim 8 wherein said markings are carried partly on said extension keys and partly on said panel adjacent certain of said cutouts.

* * * * *